(12) United States Patent
Cagnoni et al.

(10) Patent No.: US 7,124,741 B2
(45) Date of Patent: Oct. 24, 2006

(54) METHOD FOR CONTROLLING AN INJECTOR WITH VERIFICATION THAT PLUNGER MOVEMENT HAS OCCURRED

(75) Inventors: Michele Cagnoni, Frossasco (IT);
Fausto Calcagno, Santena (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 169 days.

(21) Appl. No.: 10/974,959

(22) Filed: Oct. 28, 2004

(65) Prior Publication Data

US 2005/0140351 A1 Jun. 30, 2005

(30) Foreign Application Priority Data

Oct. 31, 2003 (IT) .......................... BO2003A0642

(51) Int. Cl.
*F02M 51/00* (2006.01)
*F02M 1/00* (2006.01)
(52) U.S. Cl. ................. 123/472; 123/478; 361/152
(58) Field of Classification Search .............. 123/472, 123/478, 479, 480; 361/152, 154, 155; 324/378, 324/393, 399
See application file for complete search history.

(56) References Cited

U.S. PATENT DOCUMENTS 3,777,702 A * 12/1973 Fitzgerald .............. 118/668

| 6,138,638 A * | 10/2000 | Morikawa ............... 123/295 |
| 6,981,489 B1 * | 1/2006 | Petrone et al. ............. 123/490 |
| 7,055,494 B1 * | 6/2006 | Nishimaki ................ 123/299 |
| 2004/0065747 A1 * | 4/2004 | Petrone et al. ................ 239/5 |

FOREIGN PATENT DOCUMENTS

| DE | 38 17 770 A1 | 11/1989 |
| EP | 1 179 669 A1 | 2/2002 |
| WO | 94/13991 | 6/1994 |

* cited by examiner

*Primary Examiner*—John T. Kwon
(74) *Attorney, Agent, or Firm*—Jacobson Holman PLLC

(57) ABSTRACT

A method for controlling an injector with verification that plunger movement has occurred; the method providing application of a time-variable voltage to the terminals of an injector drive circuit in order to cause a current wave to flow through said drive circuit; detection of a verification voltage between the terminals of the drive circuit once the current through the drive circuit has died away at the end of the injection phase, measurement of a verification time during which the verification voltage is greater than a first predetermined threshold value and diagnosis of the absence of plunger movement if the verification time is less than a second predetermined threshold value.

8 Claims, 4 Drawing Sheets

METHOD FOR CONTROLLING AN INJECTOR WITH VERIFICATION THAT PLUNGER MOVEMENT HAS OCCURRED

The present invention relates to a method for controlling an injector with verification that plunger movement has occurred.

The present invention is advantageously applied to controlling an injector in a direct petrol injection system, to which the following description will make explicit reference without consequently restricting the general scope thereof.

BACKGROUND OF THE INVENTION

Petrol engines equipped with direct fuel injection have recently been introduced onto the market, these being engines in which the petrol is injected directly into the cylinders by suitable injectors, each of which is arranged in the crown of a respective cylinder and is current-driven by a central control unit. Usually, the central control unit is capable of causing a time-variable current wave to flow through an injector drive circuit, said wave being intended to generate a force of an electromagnetic nature in order to displace the injector plunger from a closed position to an open position against the action of a spring that tends to hold the plunger in the closed position.

Usually, a central control unit also implements diagnostic functions designed to verify the correct operation of the various engine components, in order either to notify the driver of the necessity for maintenance or to use a special control strategy that takes account of any failures or malfunctions. The various diagnostic functions provided in a known control unit usually include verification that movement of the plunger of each injector has occurred; in other words, for each injector a check is made of whether the injector plunger has actually opened or closed after each injection command. Currently, verification that movement of the plunger for each injector has occurred is carried out by means of a software verification strategy, which is deductive in nature and is carried out on the engine system after a relatively long period of time; however, this verification strategy is slow, somewhat inaccurate and entails the use of considerable computing resources.

In known central control units, it is also possible to measure the electrical resistance of the drive circuit for each injector in order to verify whether the drive circuit is open, short-circuited or whether the drive circuit has a terminal shorted towards the positive or negative pole of the battery of the vehicle; however, the plunger of an injector could be jammed even if the associated drive circuit exhibits no obvious defects and this verification method thus does not make it possible to identify all possible injector malfunctions. Moreover, the ongoing increases in fuel injection pressures are accompanied by a consequent increase in the control currents and thus a decrease in the electrical resistance of the injector drive circuits; it is thus increasingly difficult and complicated to measure the resistance of the drive circuit with an accuracy sufficient to differentiate a short circuit condition from an acceptable operating condition.

Finally, a proposal has been made to use appropriate dedicated sensors (accelerometric, pressure or positional) attached to the injectors in order to monitor the correct movement of the plunger; however, this solution is extremely expensive owing to the costs of purchasing and installing the sensors.

SUMMARY OF THE INVENTION

The aim of the present invention is to provide a method for controlling an injector with verification that movement of the plunger has occurred, said method not exhibiting any of the above-described disadvantages and, furthermore, being straightforward and economic to implement.

The present invention provides a method for controlling an injector with verification that plunger movement has occurred; the method providing application of a time-variable voltage to the terminals of a drive circuit of the injector in order to cause a current wave to flow through said drive circuit; the method being characterised by detection of a verification voltage between the terminals of the drive circuit once the current through the drive circuit has died away at the end of the injection phase, measurement of a verification time during which the verification voltage is greater than a first predetermined threshold value and diagnosis of the absence of plunger movement if the verification time is less than a second predetermined threshold value.

BRIEF DESCRIPTION OF THE DRAWINGS

The present invention will now be described with reference to the attached drawings, which illustrate some non-limiting embodiments thereof, in which.

DETAILED DESCRIPTION OF THE INVENTION

Figure 1:
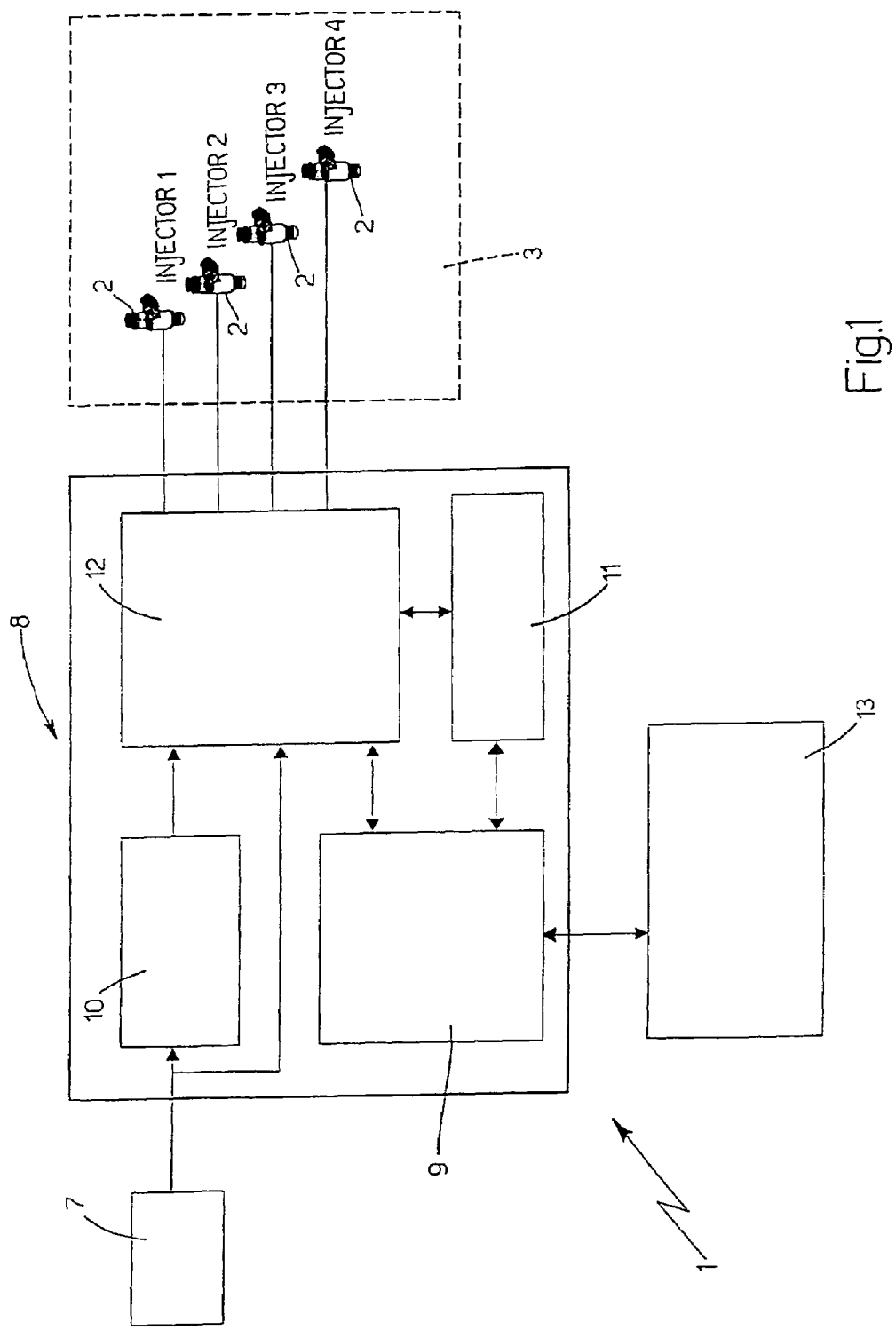
FIG. 1 is a diagrammatic view of the control device that is the subject-matter of the present invention.

In FIG. 1, 1 denotes the overall device for controlling four injectors 2 of known type (denoted in FIG. 1 with the names INJECTOR1, INJECTOR2, INJECTOR3, INJECTOR4) of an explosion engine 3 (shown diagrammatically) equipped with four cylinders (not shown) arranged in line. Each injector 2 is arranged in correspondence with the crown of a respective cylinder (not shown) of the engine 3 in such a way as to inject a predetermined quantity of petrol directly into said cylinder.

Each injector 2 is of a known type and comprises a valve (not shown in detail) that controls the flow of the injected petrol and is provided with a plunger that can move between a closed position and an open position; in particular, the injector 2 is provided with an electromagnetic actuator (not shown in detail), which is actuated by a drive circuit and is capable of displacing the plunger from the closed position to the open position against the action of a spring (not shown), which tends to hold the plunger in the closed position.

Figure 2:
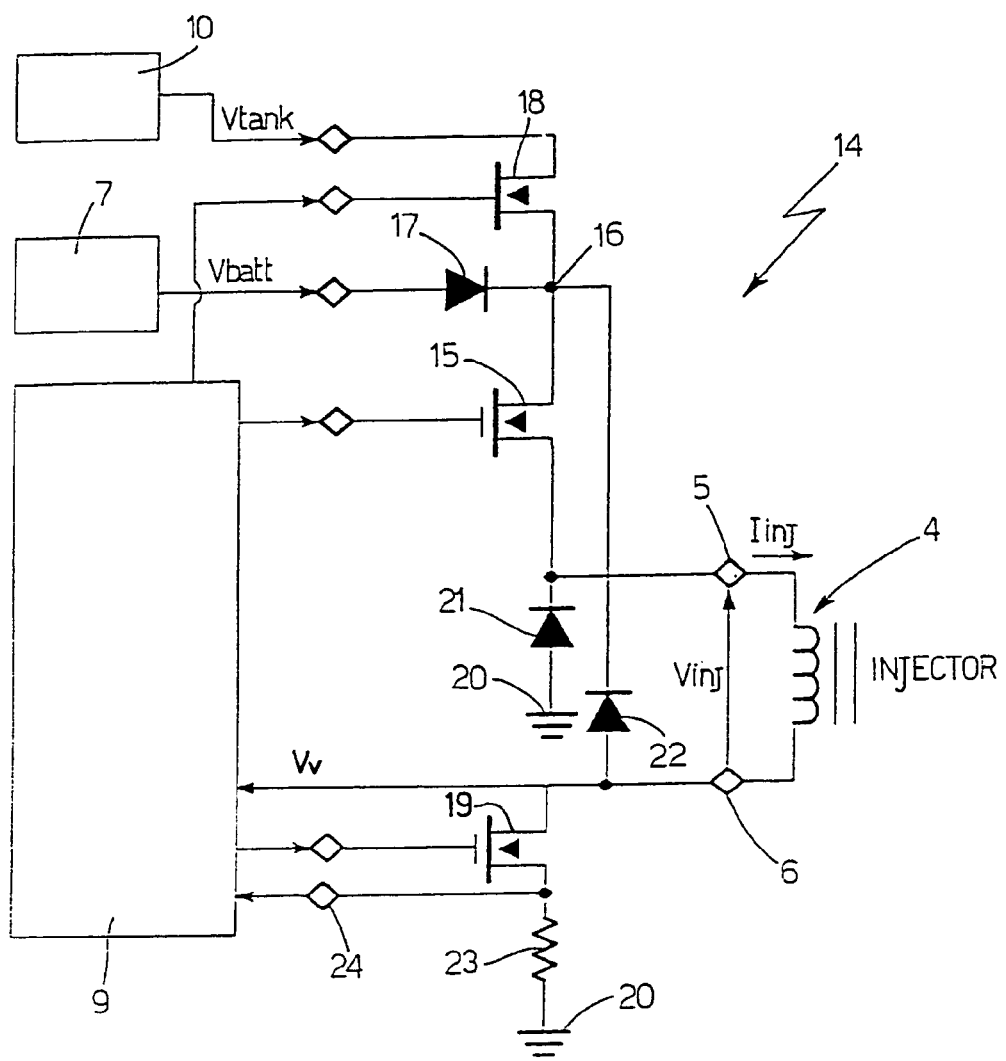
FIG. 2 is a diagrammatic view of an actuating circuit of the control device in FIG. 1.

As shown in FIG. 2, each injector 2 is current-driven and is provided with a drive circuit 4 for the respective electromagnetic actuator comprising a pair of terminals 5 and 6; in order to actuate an injector 2, it is necessary to cause an electric current of a predetermined intensity to flow through the respective drive circuit 4. The flow rate of the petrol injected by each injector 2 during its open phase is substantially constant and thus the quantity of petrol injected by the injector 2 into the respective cylinder (not shown) is directly proportional to the open time of said injector 2.

The control device 1 is powered by a battery 7 of the engine 3 and comprises a control unit 8, which is provided with a controller 9, a converter 10 powered by the battery 7, a diagnostic unit 11 and a power stage 12.

The controller 9 interacts with a control unit 13 (typically a microprocessor) of the engine 3 in order to receive from said control unit 13 for each injector 2 and for each engine cycle the desired value of the open time Tinj (directly proportional to the desired value of the quantity of petrol to be injected) and the injection start time. On the basis of the data received from the control unit 13, the controller 9 drives the power stage 12, which actuates each injector 2 by passing a predetermined (time-variable) electric current Iinj through the respective drive circuit 4 by applying a (time-variable) voltage Vinj across the corresponding terminals 5 and 6.

The power stage 12 receives the drive signals from the controller 9 and is powered either directly by the battery 7 with a nominal voltage Vbatt of 12 volts or by the converter 10 with a nominal voltage Vtank of 68 volts (and generally of between 50 and 90 volts). The converter 10 is a DC/DC converter of a known type, which is capable of raising the voltage Vbatt of the battery 7 to the voltage Vtank of 68 volts.

The diagnostic unit 11 is capable of interacting either with the controller 9, or with the power stage 12, in such a manner as to verify, in a manner to be described below, the proper actuation of the injectors 2.

As shown in FIG. 2, the power stage 12 comprises for each injector 2 a respective control circuit 14 which is connected to the terminals 5 and 6 of the respective drive circuit 4 and is driven by the controller 9 in order to cause a predetermined current Iinj to flow through said drive circuit 4.

Each control circuit 14 comprises a transistor 15 driven by the controller 9 and capable of connecting the terminal 5 of the respective drive circuit 4 with an intermediate terminal 16 which is connected to the voltage Vbatt of the battery 7 through a non-return diode 17 and is connected to the voltage Vtank of the converter 10 through a transistor 18 driven by the controller 9. Each control circuit 14 furthermore comprises a transistor 19 driven by the controller 9 and capable of connecting the terminal 6 of the respective drive circuit 4 with a common earth 20, and two recirculation diodes 21 and 22 connected respectively between the terminal 5 and the earth 20 and between the terminal 6 and the intermediate terminal 16. According to a preferred embodiment shown in FIG. 2, the transistors 15, 18 and 19 are of "MOS" type.

A shunt resistor 23 is inserted between the transistor 19 and the earth 20, said resistor being provided with a measurement terminal 24; by measuring the voltage prevailing across the resistor 23 (i.e. the voltage present between the measurement terminal 24 and the earth 20), it is possible measure the intensity of the current Iinj when the transistor 19 is conducting. According to another embodiment, not shown, the shunt resistor 23 is connected directly to the terminal 5 in order to measure the intensity of the current Iinj continuously.

Figure 3:
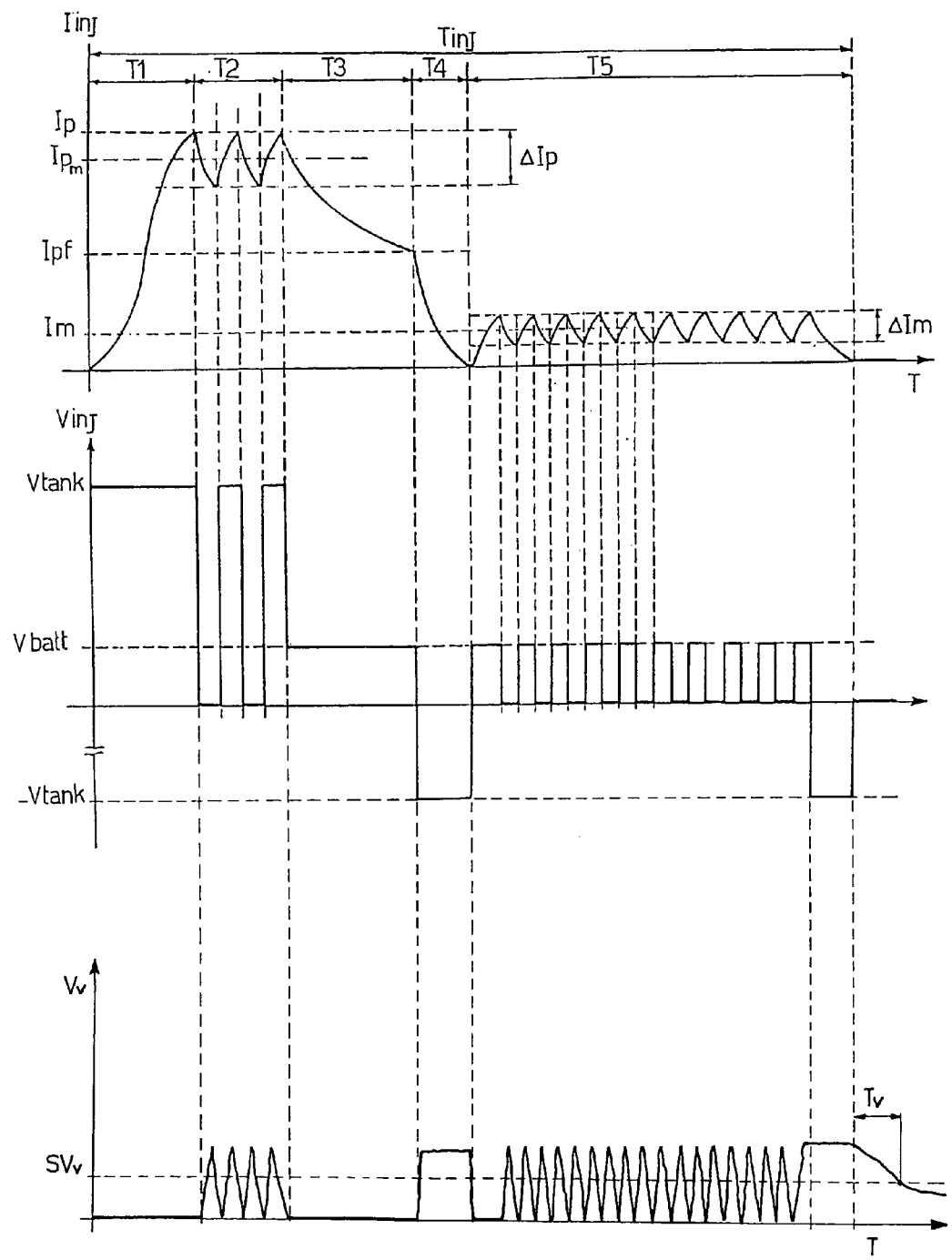
FIG. 3 shows the time profile of various characteristic electrical parameters of the circuit in FIG. 2.

As shown in FIGS. 2 and 3, an injection phase of an injector 2 will now be described with particular reference to the time profile of the current Iinj flowing through the terminals 5 and 6 of the respective drive circuit 4 and the time profile of the voltage Vinj across said terminals 5 and 6.

Initially, the transistors 15, 18 and 19 are all deactivated, the drive circuit 4 is isolated, the current Iinj has a value of zero and the injector is closed.

To start the injection phase, the transistors 15, 18 and 19 are simultaneously caused to conduct, the terminal 5 being connected to the voltage Vtank via the transistors 15 and 18, the terminal 6 thus being connected to the earth 20 via the transistor 19 and the voltage Vinj being equal to Vtank. Under these conditions, the current Iinj increases rapidly for a time T1 up to a peak value Ip and the injector 2 begins the plunger movement phase.

When the current Iinj reaches the value Ip, a current control (which uses the measurement of the current Iinj performed using the resistor 23) maintains the current Iinj within an amplitude range ΔIp centred on a mean value Ipm for a time T2 by acting on the drive of the transistor 19, which switches cyclically between a conducting state and a deactivated state. During the conducting state of the transistor 19, the terminal 5 is connected to the voltage Vtank via the transistors 15 and 18, the terminal 6 is connected to the earth 20 via the transistor 19, the voltage Vinj is equal to Vtank and the value of Iinj increases; whereas during the deactivated state of the transistor 19, the recirculation diode 22 starts to conduct and short-circuits the terminals 5 and 6 via the transistor 15, the voltage Vinj is substantially zero and the value of Iinj decreases. The intensity of the current Iinj is measured only when the transistor 19 is conducting, since the measurement resistor 23 is arranged downstream from the transistor 19; however, the time constant of the drive circuit 4 is known and therefore the controller 9 is able to calculate when the current Iinj reaches the lower limit (Ipm−ΔIp/2) and the transistor 19 must be caused to conduct again.

After the current Iinj has remained substantially at the value Ip for the time T2, the controller 9 causes the transistors 15 and 19 to continue to conduct and deactivates the transistor 18, the terminal 5 thus being connected to the voltage Vbatt via the transistor 15 and the diode 17, the terminal 6 being connected to the earth 20 via the transistor 19 and the voltage Vinj being equal to Vbatt. Under these conditions, the current Iinj drops slowly for a predetermined time T3 to a value IpF; at this point the controller 9 simultaneously deactivates all three transistors 15, 18 and 19 and, as a result of the current Iinj that cannot die away instantaneously, the recirculation diode 21 and, inversely, the transistor 18 start to conduct, the terminal 5 thus being connected to the earth 20 via the recirculation diode 21, the terminal 6 being connected to the voltage Vtank via the recirculation diode 22 and the transistor 18, the voltage Vinj being equal to −Vtank and the current Iinj decreasing rapidly.

It should be noted that the transistor 18 starts to conduct inversely as a result of the characteristics of the MOS junction, which has a parasitic diode that is arranged in parallel with said junction and is capable of being biased inversely with respect to the junction.

After a time T4 sufficient substantially to cancel out the current Iinj, the controller 9 adjusts the current Iinj substantially to a value Im and maintains it, causing the transistor 15 to continue to conduct and acting on the drive of the transistor 19, which switches cyclically between a conducting state and a deactivated state. In this situation, the transistor 19 is driven to maintain the current Iinj within an amplitude range ΔIm centred on Im for a time T5 according to the methods described above. At the end of the time T5, all the transistors 15, 18 and 19 are deactivated and the current Iinj rapidly drops to zero according to the methods described above.

Once the current Iinj drops to zero and remains at a zero value for a predetermined time, the injector 2 closes and stops injecting petrol. As clearly shown in FIG. 3, the sum of the times T1, T2, T3, T4 and T5 is equal to the total injection time Tinj, i.e. to the total time during which the injector 2 remains open.

The diagnostic unit 11 is capable of verifying, for each injector 2, that movement of the corresponding plunger has occurred following the supply of a wave of current Iinj to the associated drive circuit 4. In order to verify that movement of the plunger of an injector 2 has occurred, the diagnostic unit 11 makes use of the voltage Vv of the terminal 6 of the corresponding drive circuit 4 (i.e. the terminal 6 of the drive circuit 4 that is not supplied). The diagnostic unit 11 detects the duration of time Tv during which the voltage Vv of the terminal 6 remains above a predetermined threshold value SVv starting from the moment at which the current Iinj has died away until the end of the injection phase; if the time Tv is less than a respective predetermined threshold value STv, the diagnostic unit 11 reports that the plunger has failed to move. Obviously, in order to avoid erroneous failure signals, it is preferable for the diagnostic unit 11 to report that a plunger has failed to move only if the frequency at which the corresponding measured times Tv are below the threshold value STv is in turn greater than a minimum value; in other words, in the event of the actual failure of an injector, a large number of times Tv detected in succession are less than the threshold value STv, while an isolated case, in which a single time Tv is less than the threshold value STv, is probably attributable to an accidental error in measuring said time Tv.

The above-described measurement of the time Tv is based on the fact that when the current Iinj drops to zero sufficiently quickly (which is always the case in modern injectors 2 in which the current Iinj is zeroed by means of a high inverse voltage equal to −Vtank), the magnetic circuit of the electromagnetic actuator of the injector 2 still remains magnetised and thus the displacement of the plunger returning to the closed position under the effect of the spring within a magnetic field that is still present generates a counter-electromotive force between the terminals 5 and 6 of the drive circuit 4; this counter-electromotive force can be measured between the terminals 5 and 6 of the drive circuit 4 and is a clear indication that the plunger has actually moved. In other words, if, once the current Iinj passing through the drive circuit 4 has dropped to zero, a voltage Vv (i.e. a counter-electromotive force) is still present between the terminals 5 and 6 of the drive circuit 4 for a time Tv, then the plunger is still moving and thus a movement of the plunger actually has been detected during the injection phase; on the other hand, if, once the current Iinj passing through the drive circuit 4 has dropped to zero, there is no voltage Vv (i.e. a counter-electromotive force) between the terminals 5 and 6 of the drive circuit 4, then the plunger has not moved during the injection phase.

As stated above, the above explanation applies if the current Iinj drops to zero sufficiently quickly, but this is always the case in modern injectors 2 in which the current Iinj is zeroed by means of a high inverse voltage equal to −Vtank; in particular, in an injector 2 of the type normally used, the current Iinj drops to zero in a few tens of microseconds, while the mechanical closing time of the plunger and thus the duration of the voltage Tv is of a higher order of magnitude (some hundreds of microseconds).

Figure 4:
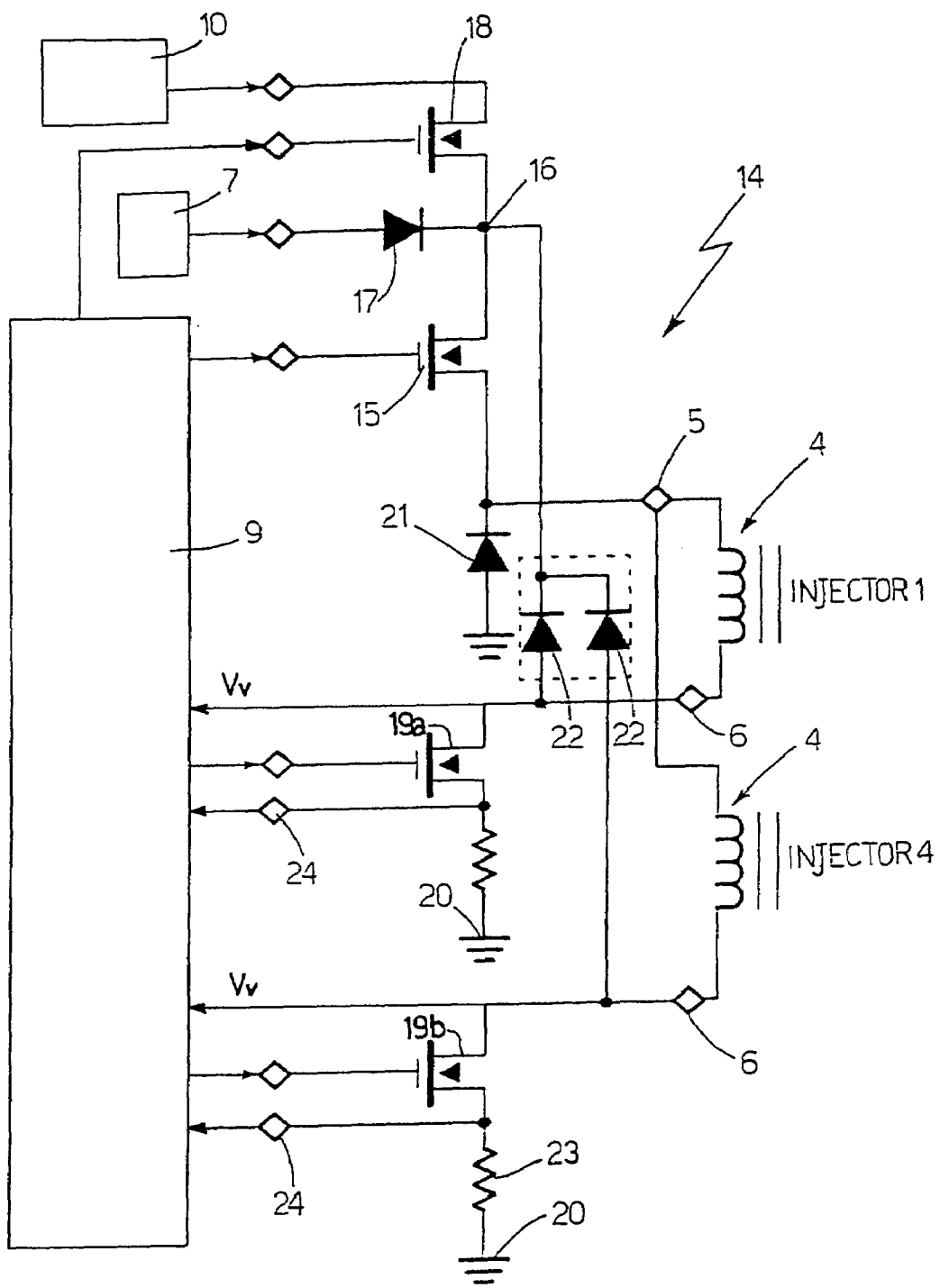
FIG. 4 is a diagrammatic view of a variant of the actuating circuit shown in FIG. 2.

According to a further embodiment shown in FIG. 4, a control circuit 14 is capable of driving two injectors 2 (for instance, as shown in FIG. 4, INJECTOR1 and INJECTOR4) using two transistors 19 (denoted 19*a* and 19*b* in FIG. 4 and associated with INJECTOR1 and INJECTOR4 respectively), each of which connects a respective terminal 6 to the earth 20. In this way, it is possible to use a smaller number of overall components, since the transistors 15 and 18 of each control circuit 14 are shared by the drive circuits 4 of two different injectors 2. The operation of the control circuit 14 in FIG. 4 is completely identical to the above-described operation of the control circuit 14 in FIG. 2; obviously, the transistor 19*a* will be driven to open the injector INJECTOR1, while the transistor 19*b* will be driven to open the injector INJECTOR4.

During the main injection phase of an injector (for example INJECTOR1), the control circuit 14 shown in FIG. 4 also makes it possible to carry out a secondary injection of the other injector (INJECTOR4), said secondary injection being performed simply by causing the respective transistor 19 (19*b* for INJECTOR4) to conduct. According to other embodiments, the secondary injection can be performed by keeping the transistor 18 constantly deactivated or by causing the transistor 18 to conduct; the difference between the two solutions lies in the fact that, in one case (transistor 18 constantly deactivated), the current wave Iinj of the secondary injection has a gentler pulse (and thus slower and less accurate opening) as it is generated by a voltage Vinj equal to Vbatt and, in the other case (transistor 18 initially caused to conduct), the current wave Iinj of the secondary injection has a much steeper pulse as it is generated by a voltage Vinj equal to Vtank.

The above-described method for verifying that movement of the plunger of an injector 2 has occurred exhibits various advantages: it makes it possible to recognise that movement of the plunger has occurred for every single actuation of the respective injector 2 in an extremely quick and accurate manner, it is influenced neither by the voltage Vbatt supplied by the battery nor by the ambient temperature, it can be calibrated in accordance with the particular requirements of the engine 1 (petrol injection pressure, structural characteristics of the injector 2, mechanical design strategy etc.) and finally it is straightforward and economical to implement in that it does not require additional circuits or hardware components in comparison with those normally provided for controlling the injectors 2.

Thanks to the numerous advantages of the above-described method for verifying that movement of the plunger of an injector 2 has occurred, said method can obviously be used with an injector capable of injecting any kind of fuel, such as for example petrol, diesel fuel, alcohol, methane, LPG etc.

The invention claimed is:

1. Method for controlling an injector (2) with verification that plunger movement has occurred; the method providing application of a time-variable voltage (Vinj) to the terminals (5, 6) of a drive circuit (4) of the injector (2) in order to cause a current wave (Iinj) to flow through said drive circuit (4); the method being characterised by detection of a verification voltage (Vv) between the terminals (5, 6) of the drive circuit (4) once the current (Iinj) through the drive circuit (4) has died away at the end of the injection phase, measurement of a verification time (Tv) during which the verification voltage (Vv) is greater than a first predetermined threshold value (SVv) and diagnosis of the absence of plunger movement if the verification time (Tv) is less than a second predetermined threshold value (STv).

2. Method according to claim 1, in which the verification voltage (Vv) is detected between a terminal (6) of the drive circuit (4) and an electrical earth (20).

3. Method according to claim 2, in which a first terminal (5) of the drive circuit (4) is connected selectively to a supply voltage, while a second terminal (6) of the drive circuit (4) is connected selectively to the electrical earth; the verification voltage (Vv) being detected between the second terminal (6) of the drive circuit (4) and the electrical earth (20).

4. Method according to claim 1, in which the time-variable current wave (Iinj) comprises an initial pulse section (T1, T2, T3) exhibiting a relatively high intensity of current (Iinj), an intermediate section (T4) during which the current (Iinj) intensity falls rapidly substantially to zero and a subsequent final section (T5) exhibiting a relatively low intensity of current (Iinj).

5. Method according to claim 4, in which, during the initial section (T1, T2, T3), the injector (2) drive circuit (4) is controlled by means of a first voltage (Vtank) and, during the final section (T5), the injector (2) drive circuit (4) is controlled by means of a second voltage (Vbatt) which is equal to the battery voltage and is less than the first voltage (Vtank).

6. Method according to claim 1, in which the time-variable voltage (Vinj) is applied to the terminals (5, 6) of the drive circuit (4) of the injector (2) by an actuation circuit (14), which comprises first transistor means (15, 18) for connecting a first terminal (5) of the drive circuit (4) to a voltage generator (7; 10), second transistor means (19) for connecting a second terminal (6) of the drive circuit (4) to an earth (20) of the voltage generator (7; 10), and recirculation diodes (21; 22) enabling the discharge of the inductances of the drive circuit (4).

7. Method according to claim 6, in which the first transistor means (15) comprise a pair of transistors (15, 18) for selectively connecting the first terminal (5) to a first and a second voltage generator (7, 10).

8. Method according to claim 7, in which a first recirculation diode (21) connects the first terminal (5) to the electrical earth (20), and a second recirculation diode (22) connects the second terminal (6) to said voltage generator (7, 10).

* * * * *